United States Patent [19]

Chen

[11] Patent Number: 4,556,291
[45] Date of Patent: Dec. 3, 1985

[54] MAGNETO-OPTIC STORAGE MEDIA

[75] Inventor: Tu Chen, Saratoga, Calif.

[73] Assignee: Xerox Corporation, Stamford, Conn.

[21] Appl. No.: 520,922

[22] Filed: Aug. 8, 1983

[51] Int. Cl.⁴ .......................... G02F 1/09; G11C 13/06
[52] U.S. Cl. ..................................... 350/377; 350/355;
369/13; 360/131; 365/122
[58] Field of Search ............... 350/355, 377, 378, 374,
350/375, 376, 388; 365/173, 121, 122; 369/13;
360/110, 114, 131

[56] References Cited

U.S. PATENT DOCUMENTS

| | | | |
|---|---|---|---|
| 3,838,450 | 9/1974 | Bongers et al. | 360/59 |
| 3,845,306 | 10/1974 | Kohlmannsperger | 250/316 |
| 3,928,870 | 12/1975 | Ahrenkiel et al. | 360/59 |
| 4,202,022 | 5/1980 | Imamura et al. | 360/114 |
| 4,466,035 | 8/1984 | Connell et al. | 369/84 |

FOREIGN PATENT DOCUMENTS

| | | | |
|---|---|---|---|
| 5052535 | 12/1978 | Japan | 360/59 |
| 5735581 | 5/1982 | Japan | 360/114 |
| 7713503 | 12/1977 | Netherlands | 360/59 |

Primary Examiner—John K. Corbin
Assistant Examiner—Bruce S. Shapiro
Attorney, Agent, or Firm—Leonard Zalman

[57] ABSTRACT

A magneto-optic storage media which utilizes two layers or films of magnetic material, with the magneto-optic hysteresis loop of one of the films being of a sense opposite to the sense of the magneto-optic hysteresis loop of the other film. The media permits the Farraday effect polarization rotations produced by one of the magnetic films to be in phase with Kerr effect polarization rotations produced by the other of the magnetic films, such that additive mode conversion is provided from different portions of the media whereby the detected signal has an increased signal-to-noise ratio.

6 Claims, 7 Drawing Figures

MAGNETO-OPTIC STORAGE MEDIA

BACKGROUND OF THE INVENTION

In the development of magneto-optic storage media for optical memory device applications, recent interest has been focused on thin films of amorphous rare earth-transition metals in binary alloy such as TbFe or GdFe and ternary alloys such as TbGdFe or TbCoFe or equivalent alloy systems, as suitable magneto-optic materials for the storage media because of the unusual anisotropy and magneto-optic properties of such metals. For information storage applications based on thermomagnetic writing, the bit information is stored at discrete areas by writing with a focused high power laser in combination with an applied magnetic field. To read or retrieve the stored information, the bit areas are scanned with a lower power, focused, polarized laser beam, in combination with photodetector and analyzer, resulting in a read back signal.

For practical applications, the written bit areas should be kept as small as possible to maximize the storage capacity of a given portion of medium. However, decreasing the bit area size also decreases the read back signal amplitude level and hence reduces the signal-to-noise ratio of the medium. Several structures, such as overcoating the medium with a high refractive index dielectric layer of appropriate thickness or providing a reflective underlayer, previously have been proposed to enhance the read back signal level from the medium during information retrieval by causing the read back signal to experience increasing mode conversion (polarization rotation). As explained hereinafter, the previously proposed structures (dielectric overcoat or reflective undercoat) do provide mode conversion of the read beam incident on a bit area but with a limit. Accordingly, there remains a need for a new medium structure that will provide further increase in mode conversion of the read beam incident on a bit area over the previously proposed structures, which will result in a significant increase in signal-to-noise ratio and hence permit a significant increase in bit density.

SUMMARY OF THE INVENTION

A magneto-optic storage media which utilizes two layers or films of magnetic material, with the magneto-optic hysteresis loop of one of the films being of a sense opposite to the sense of the magneto-optic hysteresis loop of the other film. The media permits the Farraday effect polarization rotations produced by one of the magnetic films to be in phase with Kerr effect polarization rotations produced by the other of the magnetic films, such that additive mode conversion is provided from different portions of the media whereby the detected signal has an increased signal-to-noise ratio.

DETAILED DESCRIPTION OF THE INVENTION

Figure 1:
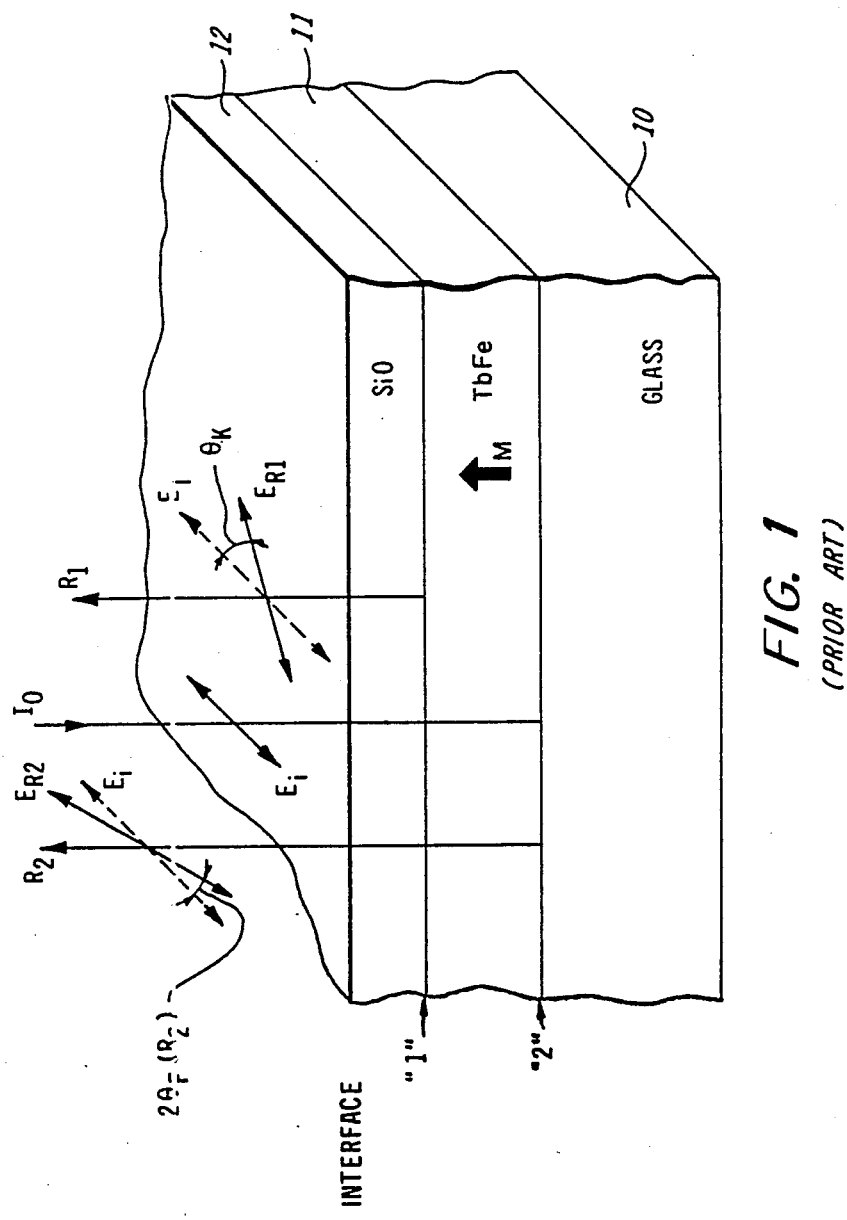
FIGS. 1 and 2 are cross-sectional views of prior art magneto-optic storage media.
Figure 2:
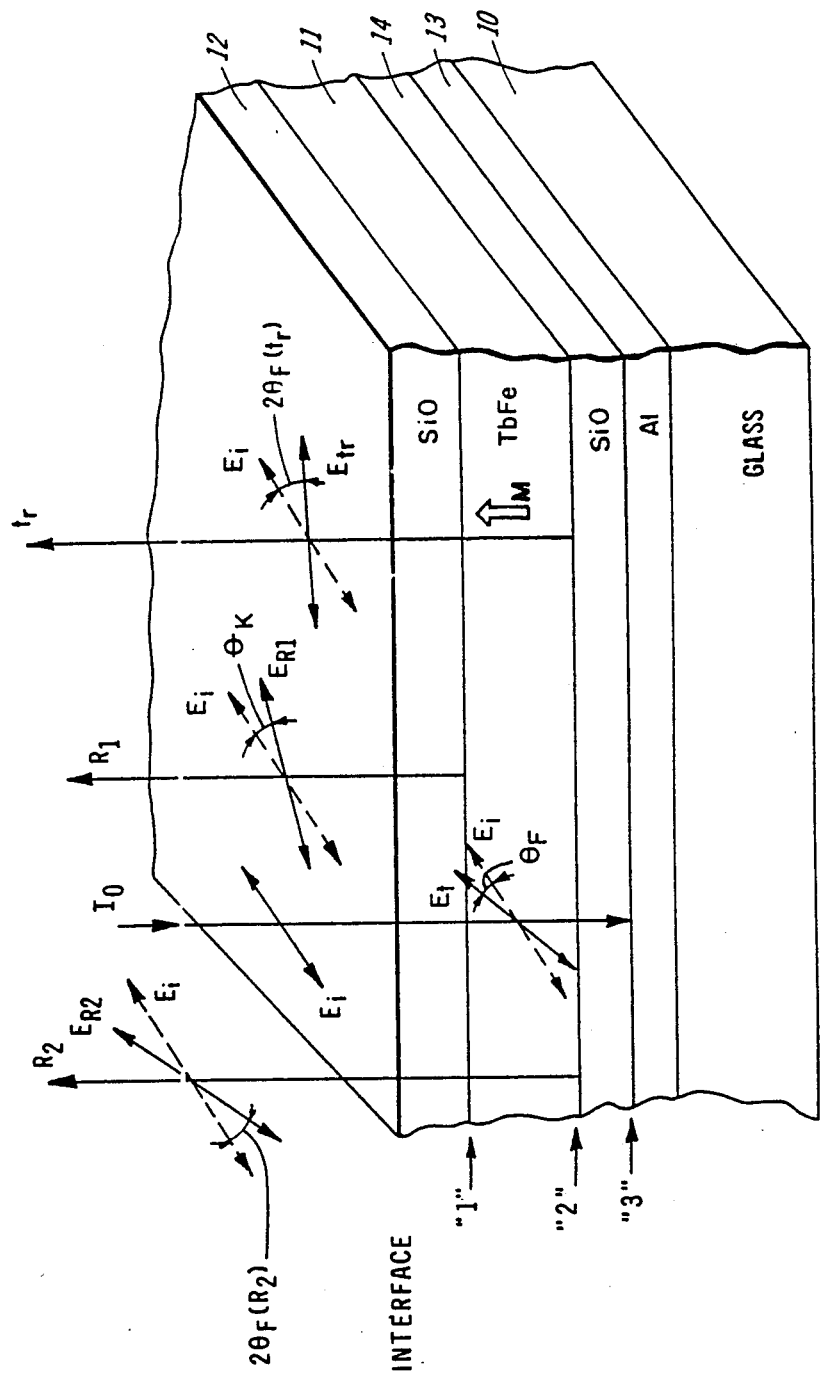

To provide a full understanding of the proposed media, a discussion of the previously disclosed dielectric overcoat media and the previously disclosed reflective undercoat media, FIGS. 1 and 2, respectively, is appropriate. Discussed first is the dielectric overcoat medium of FIG. 1 which consists of a substrate 10, depicted as glass, a magnetic layer 11, depicted as TbFe, deposited on the substrate 10, and a dielectric layer 12, depicted as silicon oxide, deposited on the magnetic layer 11. The magnitization direction "M" of the magnetic layer 11 is as indicated. The read beam $I_o$ has an electrical vector or polarization direction $E_i$, with the portion of beam $I_o$ reflected from interface "1" indicated as $R_1$ and the portion of the beam $I_o$ reflected from the interface "2" (a strong reflection) indicated as $R_2$. Beam portions $R_1$ and $R_2$ are offset slightly to the right and left, respectively, for clarity of explanation. The optical enhancement of the output beam of the overcoated dielectric structure of FIG. 1 is accomplished mainly by an increase in contrast through reduction of reflected light intensity using interference principles. Actual mode conversion from parallel to the electrical vector $E_i$ to the perpendicular direction (i.e., conversion from parallel mode to perpendicular mode) due to Kerr magneto-optic rotation at interface "1", which causes the electrical vector $E_{R1}$ of the reflected beam portion $R_1$ to be rotated clockwise by the Kerr magneto-optic rotation angle $\theta_K$, is reduced or offset by a counterclockwise Farraday effect magneto-optic rotation of the reflected beam portion $R_2$ (a rotation of $2\theta_F(R_2)$) since, in the case of iron and many iron based alloys, such as TbFe, the sign of the polarization rotation due to the Kerr effect is always opposite to the sign of the polarization rotation due to the Farraday effect. Thus, due to the Kerr effect and Farraday effect rotations being in opposite directions, a condition that cannot be corrected in thin structures, the electrical vector of the beam reflected from a bit area will deviate from the electrical vector of the beam reflected from an area surrounding the bit area by only a limited rotation.

Referring now to the reflective undercoat medium of FIG. 2, that medium consists of a substrate 10, depicted as glass, a reflective mirror layer 13, depicted as Aluminum, a dielectric layer 14 depicted as silicon oxide, a magnetic layer or film 11, depicted as TbFe, and another dielectric layer 12, also depicted as silicon oxide. The magnetization direction M of magnetic layer 11 is as indicated. In this structure, the beam portion $R_1$ again experiences a Kerr effect polarization rotation in the clockwise direction from $E_i$ to $E_{R1}$ (a rotation $\theta_K$) and the beam portion $R_2$ again experiences a Farraday effect polarization rotation in the counterclockwise direction from $E_i$ to $E_{R2}$ (a rotation of $2\theta_F(R_2)$). In addition, further Farraday effect rotation is present due to dual magneto-optic interaction of the fully transmitted portion $t_r$ of read beam $I_o$ with the film 11 during initial propogation of the transmitted beam portion $t_r$ through film 11 and then, after reflection from film 13, during repeat propogation of the transmitted beam portion $t_r$ through film 11. Once again, for clarity of explanation, the paths of beam portions $R_1$, $R_2$ and $t_r$ are shown shifted slightly. As shown, the portion $t_r$ of beam $I_o$ passing through layer 11 undergoes a first Farraday rotation $\theta_F$ during its first passage through layer 11 and after reflection from film 13 undergoes a second Farraday rotation $\theta_F$ such that the electrical vector $E_{tr}$ of the transmitted/reflected beam $t_r$ has a polarization rotation of $2\theta_F(t_r)$. Since one can induce a change in phase of the transmitted beam $t_r$ by manipulation of the thickness of one or both dielectric layers 12 and 14, the Farraday effect polarization rotation $2\theta_F(t_r)$ of beam portion $t_r$ can be made to have a direction corresponding to the Kerr effect polarization rotation direction, as indicated by the clockwise rotation of $E_{tr}$ in FIG. 2. However, since the net mode rotation of beam portion $t_r$ and of beam portion $R_1$ will be reduced by opposite rotation of beam portion $R_2$, which as previously noted is a Farraday effect rotation which is always opposite to Kerr effect rotation in the case of iron and many iron based alloys, and which can never be corrected for thin structures, the reflective undercoat medium of FIG. 2 will provide limited real mode conversion.

Figure 3:
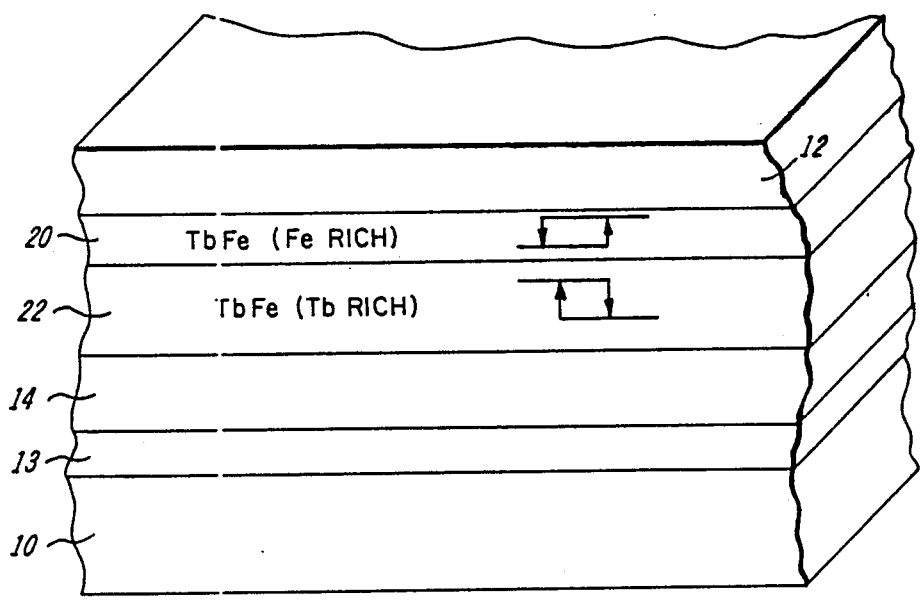
FIGS. 3 and 4 are cross-sectional views of magneto-optic storage media that provide increased real signal strength due to additive intereference for increased mode conversion.
Figure 4:
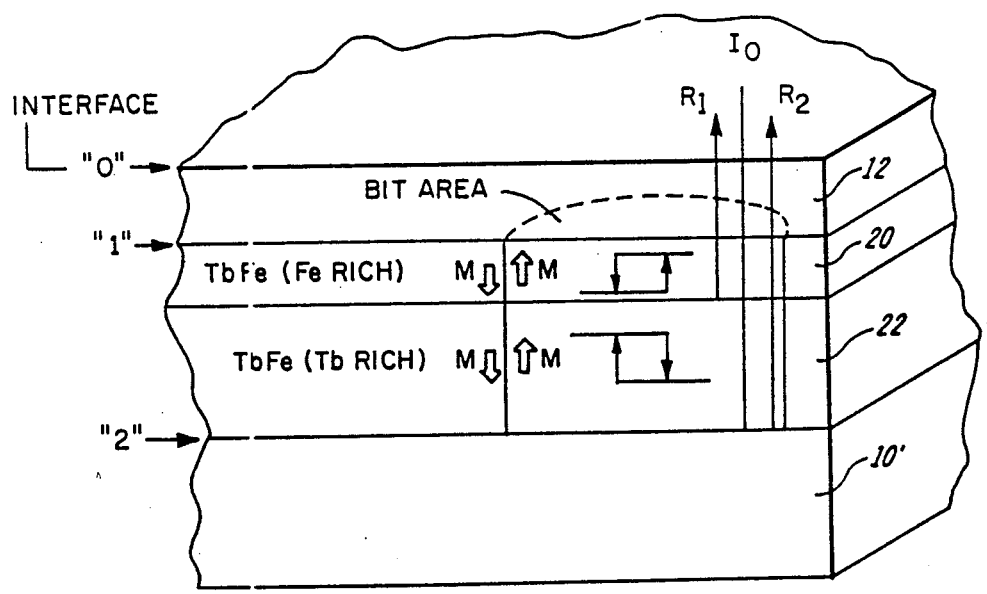

Real mode conversion and hence increased read signal strength is achieved by the new and novel storage media shown in FIGS. 3 and 4. Each media utilizes two layers of a rare earth-transition metal, with the magneto-optic hysteresis loop of one layer being of a sense opposite to the sense of the magneto-optic hysteresis loop of the other layer. Specifically, one layer has a transition metal content less than the compensation composition of the alloy system being utilized to provide a positive sensed magneto-optic hysteresis loop, and the other layer has a transition metal content more than the compensation composition of the alloy system being utilized to provide a negative sensed magneto-optic hysteresis loop.

Referring specifically to FIG. 3, the storage media consists, from top to bottom, of a first dielectric layer 12, a first rare earth transition metal film 20 having, as indicated, a positive-sensed magneto-optic hysteresis loop, a second rare earth-transition metal film 22 having, as indicated, a negative-sensed magneto-optic hysteresis loop, a second dielectric layer 14, and a reflective metallic undercoat mirror film 13 on top of a disk substrate 10. The function and the principle of operation of each of the layers or films will now be examined in relation to FIG. 5. The dielectric layer 12, which can be silicon oxide or other suitable dielectric material, serves as the oxidation protection layer for the media and also for interference or phase matching to optimize the signal-to-noise ratio of each written bit area. The dielectric layer 14, which also can be silicon oxide or other suitable dielectric material, provides for intereference or phase matching to optimize the signal-to-noise ratio contributed from the beam portion $t_r$ (the portion of beam $I_o$ reflected from interface "3") and also serves as a thermal insulator during thermal magnetic writing. The metallic undercoat layer 13 serves as the total internal reflector for the beam portion $t_r$. The two oppositely sensed magneto-optic hysteresis loop magnetic layers 20 and 22, which are the key to the novel structure, serve to provide a composite Farraday effect polarization rotation of the reflected beam portion $R_2$ (the portion of beam $I_o$ reflected from interface"2") and the beam portion $t_r$ which is of the same sign as the Kerr effect polarization rotation of the reflected beam portion $R_1$ (the portion of beam $I_o$ reflected from interface "1") thereby providing a composite output beam with significant real mode conversion.

Figure 5:
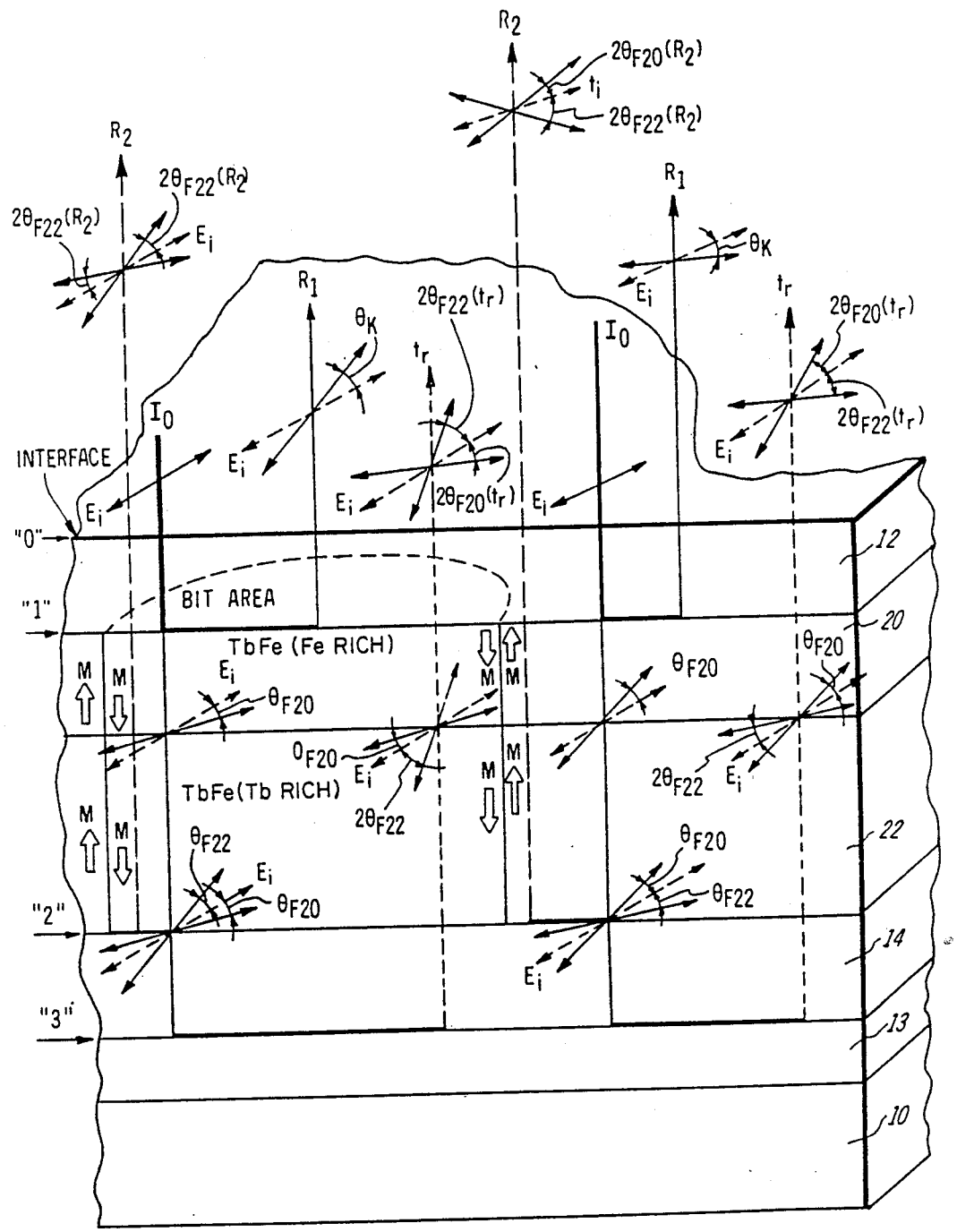
FIG. 5 depicts Kerr effect rotations and Farraday effect rotations for a bit area of the media of FIG. 3 and an adjacent area of the media of FIG. 3.
Figure 6:
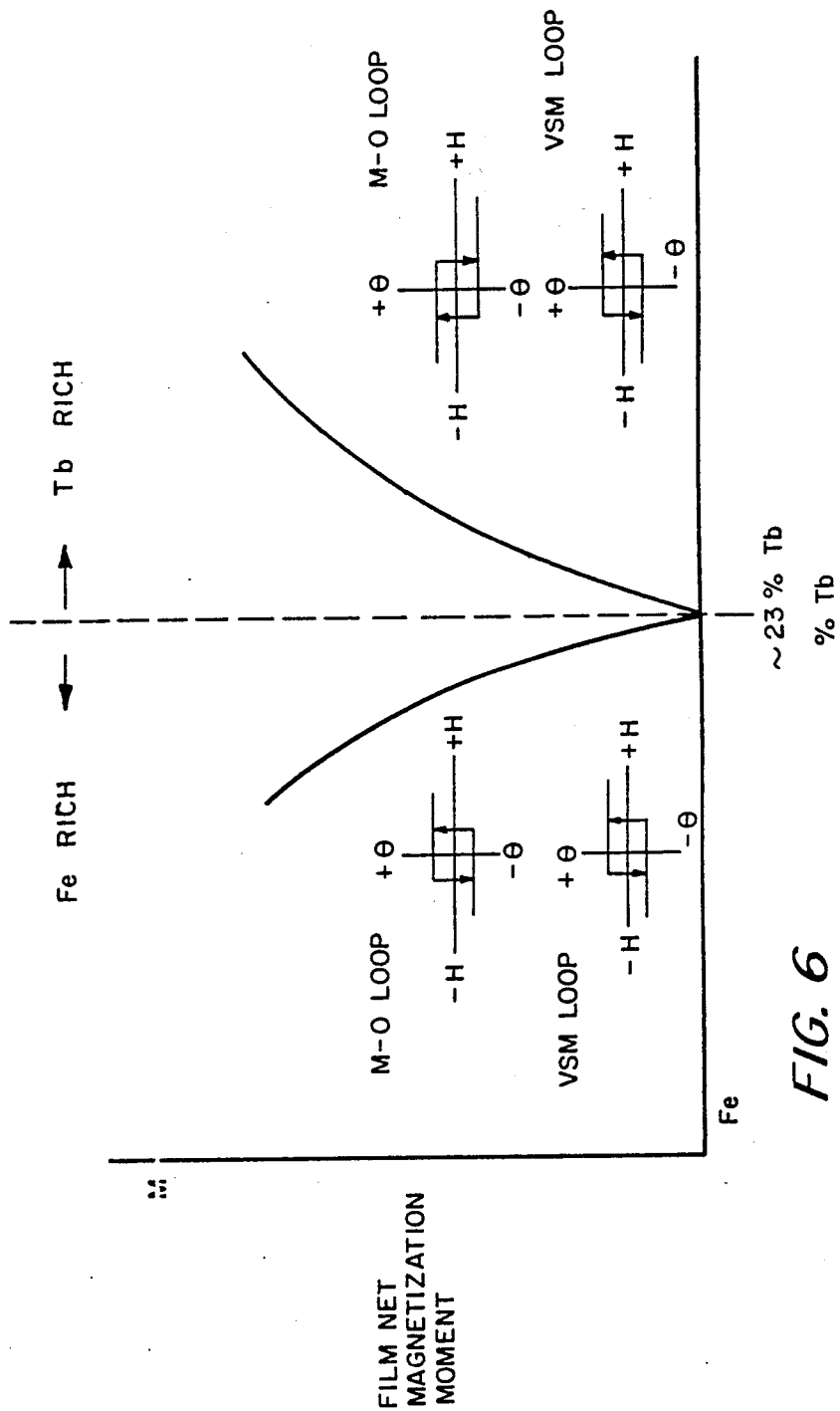
FIG. 6 shows the magnetization moment/composition dependence of TbFe on magneto-optic hysteresis loop sense and on magnetization hysteresis loop sense.
Figure 7:
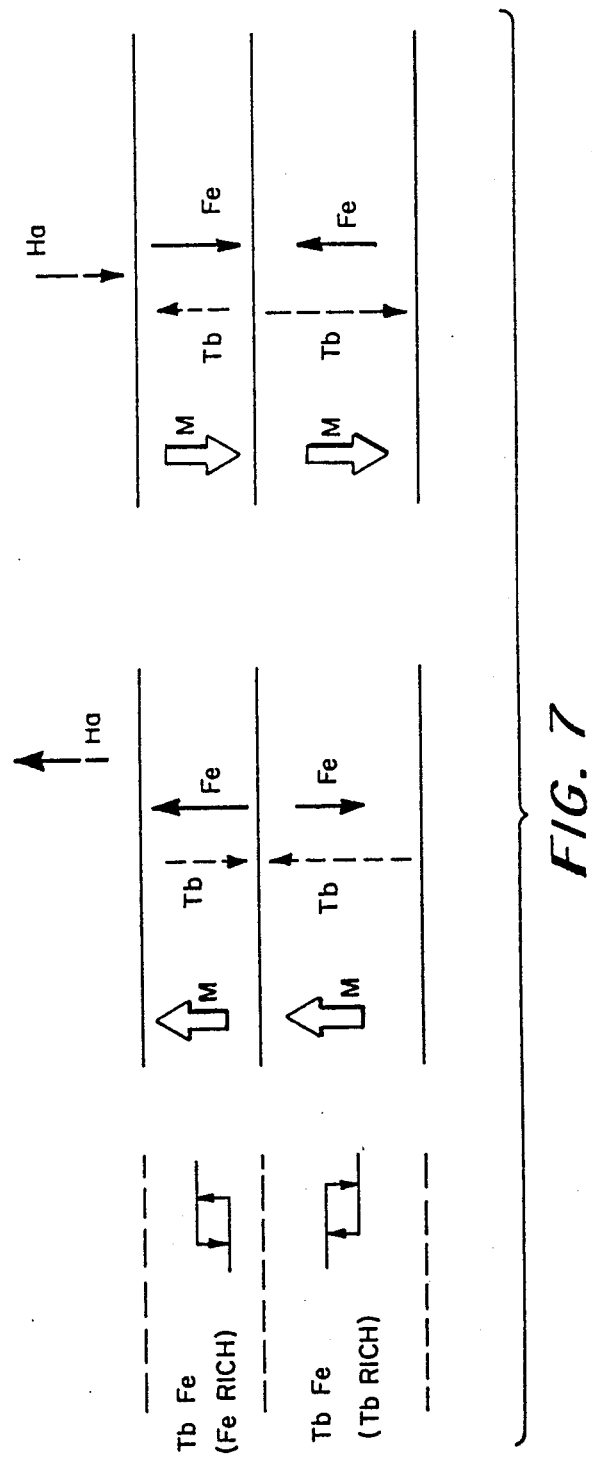
FIG. 7 depicts for the TbFe sublattice (Fe or Tb) magnetization direction as a function of applied field (or net film magnetization) direction.

Details of the structure and the principles of operation of the media of FIG. 3 will now be explained with a TbFe alloy as the rare earth transition metal used for layers 20 and 22. In amorphous rare earth transition metal film alloys, such as TbFe alloy films, the sense of the magneto-optic hysteresis loop can be either positive or negative under a given direction of net magnetization depending on whether the concentration of the rare earth-transition metal element in the alloy is below or above the compensation composition for the alloy. For TbFe alloys, this property can be seen easily by the schematic illustration of FIG. 6 showing transition element composition as controlling the sense (positive or negative) of the magneto-optic hysteresis loop. As shown, even though the magnetization loops obtained by a vibrating sample magnetometer (the VSM loops in FIG. 6) show positive for both Fe rich alloys (Tb less than the compensation composition of 23% Tb) and Tb rich alloys (Tb greater than the compensation composition of 23% Tb) under a positive film net magnetization moment M, the magneto-optic hysteresis loop of Tb rich alloys is negative while the corresponding loop for Fe rich alloys is positive. This phenomena is due to the fact that the magneto-optic effect is dominated by only one type of sublattice atom (the Fe atom in the case of TbFe) and therefore the sense of net rotation as the result of the magneto-optic interaction of light with the medium is determined by the magnetization direction of the dominant sublattice atom which has the stronger magneto-optic effect, rather than the net magnetization direction of the alloy film. For a double layer composite magnetic film structure (a Tb rich layer 22 and a Fe rich layer 20 as shown in FIG. 5), the state of net magnetization direction M in each layer, under a given field direction is identical but the magnetization directions of the sublattice atoms in one layer are opposite to that of the same type of sublattice atoms in the other layer due to the dominance of Fe atoms, as illustrated in FIG. 7. Therefore, the magneto-optic Farraday effect rotation obtained by passage of the beam portion $t_r$ through the upper layer 20 is opposite to the Farraday effect rotation obtained by passage of the beam portion $t_r$ through the lower layer 22.

Since the amount of Farraday effect rotation of each of the magnetic layers 20 and 22 is proportional to the film thickness and magneto-optic effect coefficient, a net rotation of the polarization of the beam portion $t_r$ can be obtained if use is made of different thicknesses for layers 20 and 22 or different coefficient materials. In the case of TbFe, the magneto-optic effect coefficient has a very small composition dependence within a few percent (about 8 atomic %) of both sides of the compensation composition (approximately 23 atomic % Tb), therefore, in order to obtain a net rotation of polarization after the beam portion $t_r$ has traversed both layers 20 and 22, one must vary principally the relative thicknesses of layers 20 and 22. The rule for selecting the thicknesses of each magnetic layer 20 and 22 is based on the following:

1. The Kerr rotation of beam portion $R_1$ takes place only on the top surface of the upper layer 20, and the thickness of layer 20 required to maximize the Kerr effect polarization rotation is quite small, say 50 to 200 Angstroms at which the absorption of light is nearly equal to the bulk. Therefore, a very small thickness for layer 20 will meet the requirement for near maximum Kerr effect polarization rotation.

2. Since layer 20 has a positive magneto-optic hysteresis loop, the Farraday effect polarization rotation of beam portion $t_r$ through magnetic layer 20 has the opposite sense of rotation from that of the Kerr effect polarization of beam portion $R_1$, independent of the number of passes and phase relation of the light, because of the fact that this Farraday effect rotation "sees" the same direction of sublattice moment as the Kerr effect rotation of the beam portion $R_1$. Therefore, to reduce excess absorption by the layer 20 and reduce the Farraday effect polarization rotation by layer 20, the thickness of layer 20 should be no greater than the limit imposed for maximization of the Kerr effect rotation of beam portion $R_1$.

3. The Farraday effect rotation of the beam portion $t_r$ caused by the magnetic layer 22 has the same sense of rotation as that of the Kerr effect rotation of the beam portion $R_1$. This is because the layer 22 has a negative sensed magneto-optic hysteresis loop whereby beam portion $t_r$ "sees" the opposite direction of sublattice moment. Therefore, the thickness of layer 22 should be increased as much as possible to allow more enhanced rotation of the beam portion $t_r$ in this layer. The maximum thickness for layer 22 is limited by the intensity of the transmitted beam which can traverse the medium and reach the medium surface to contribute to the net polarization rotation of beam portions $R_2$ and $t_r$ to the composite output signal, taking into account the multiple reflections and absorptions occurring in the multilayer medium.

Based on the three criteria set forth, it is apparent that the layer 20 of the double layer magnetic film should have a small thickness and that layer 22 should have a relative thickness as large as possible. A good rule for the thicknesses of layers 20 and 22 is that the thickness of layer 22 should be more than double the thickness of layer 20. Based on the computed absorption and transmittance data for a TbFe film, layer 20 can have a thickness in the range of 50 to 200 Angtroms, while layer 22 can have a thickness of in the range of 100 to 400 Angstroms.

For a general illustration, the sense of polarization rotation for the different portions of the read beam $I_o$ (with electrical vector $E_i$) from the dual magnetic layer structure of FIG. 3 in a written bit area and the surrounding area are demonstrated in FIG. 5. In FIG. 5, for simplicity of illustration, the reflection from interface "0" is neglected. Assuming that a counterclockwise polarization rotation is positive and a clockwise polarization rotation is negative, and the magnetization direction M is as shown, in the bit area the Kerr effect rotation of the beam portion $R_1$ is $\theta_K$, the net Farraday effect rotation of beam portion $R_2$ due to its initial passage through layers 20 and 22 and its return passage through layers 20 and 22 after reflection from interface "2" is $2\theta_{F22}(R_2) - 2\theta_{F20}(R_2)$, the Farraday effect rotation of the beam portion $t_r$ due to its initial passage through layer 20 is $-\theta_{F20}$, the Farraday effect rotation of the beam portion $t_r$ due to its initial passage through layer 22 is $+\theta_{F22}$, the Farraday effect rotation of the beam portion $t_r$ due to its return (after reflection from the interface "3") passage through layer 22 is $+\theta_{F22}$, and the Farraday effect rotation of the beam portion $t_r$ due to its return passage through layer 20 is $-\theta_{F20}$ (when a proper phase matching with proper thickness of dielectric 14 is used), providing in the bit area a $$\theta_{net} = \theta_K + 2\theta_{F22} - 2\theta_{F20} + 2\theta_{F22}(R_2) - 2\theta_{F20}(R_2),$$

whereas in the surrounding area where the magnetization direction M is opposite to that in the bit area, the Kerr effect rotation of the beam portion $R_1$ is $-\theta_K$, the net Farraday effect rotation of beam portion $R_2$ due to its initial passage through layers 20 and 22 and its return passage through layers 20 and 22 after reflection from interface "2" is $-2\theta_{F22}(R_2) + 2\theta_{F20}(R_2)$, the Farraday effect rotation of the beam portion $t_r$ due to initial passage through layer 20 is $+\theta_{F20}$, the Farraday effect rotation of the beam portion $t_r$ due to its initial passage through layer 22 is $-\theta_{F22}$, the Farraday effect rotation of the beam portion $t_r$ due to its return (after reflected from interface "3") passage through layer 22 is $-\theta_{F22}$, and the Farraday effect rotation of the beam portion $t_r$ due to its return passage through layer 20 is $\theta_{F20}$, providing in the surrounding area a $\theta_{net} = -\theta_K - 2\theta_{F20} + 2\theta_{F22} - 2\theta_{F22}(R_2) + 2\theta_{F20}(R_2)$.

Thus, since $\theta_{net}$ in the bit area is significantly different than $\theta_{net}$ in the surrounding area due to real mode conversion, the medium of FIG. 3 will provide the desired significant increase in signal to noise ratio.

Referring to dielectric layers 12 and 14 of FIG. 3, the thicknesses of these layers should be properly selected following the principal of interference theory, in the same way that the thicknesses of layers 12 and 14 of the prior art structures of FIGS. 1 and 2 are selected, to provide that the beam portion $t_r$ has a polarization rotation in the same sense as the polarization rotation of beam portion $R_1$.

In summary, there is disclosed an enhanced magneto-optic rotation media based on a double layer structure of amorphous rare earth-transition films which have opposite magneto-optic hysteresis loop sense to increase actual mode conversion such that the signal-to-noise ratio of the output beam is enhanced. Although the invention is described with reference to TbFe as the magnetic material of layers 20 and 22, with layer 20 being Fe rich and layer 22 being Tb rich, there is no intent to so limit the composition of the double layer magnetic material and, accordingly, layers 20 and 22 can be selected from many binary rear earth-transition metal alloys such as TbFe, GdFe, GdCo, HoFe, DyFe, etc., or ternary alloys such as TbGdFe, TbGdCo or equivalents. Also, the double layer can be selected from one alloy system for layer 20 and another alloy system for layer 22 as long as the sublattice moment in each of the two opposite under a given state of magnetization of the media to provide oppositely sensed hysteresis loops for layers 20 and 22. Also, the reflective underlayer 13 can be selected from a variety of metal films, such as aluminum, copper, gold, silver or chromium/gold, as long as the thickness of the film is sufficient to have a maximum reflection.

The media of FIG. 3 can be made by conventional processing equipment. In the case of TbFe alloys, following conventional overcoating of the substrate 10 with the reflective film 13 and deposition of dielectric layer 14, the coated substrate is placed in a radio frequency diode sputtering system having a first target with Tb plated over, or deposited at discrete locations within, an iron plate. The amount of Tb is adjusted so that the composite target produces a film with nominal composition of Tb more than the compensation composition of TbFe alloy, for example, 25 at. % Tb, to provide film or layer 22. Now the first target is replaced by a second, similar target having an amount of Tb adjusted so that the composite target produces a film with nominal composition of Tb less than the compensation composition of TbFe alloy, for example, 21 at. % Tb, to provide film or layer 20. The deposition of dielectric film 12 is now made in "situ" to prevent oxidation of the TbFe film 20.

The double film rare earth-transition metal media of FIG. 3 has the advantage of ease of writing and erasing due to the intimate contact between the two film layers 20 and 22. However, due to the metallic underlayer 13, formation of the media is a rather complicated process due to the number of layers of different materials involved. To reduce the complexity of manufacturing the media structure of FIG. 4 is also proposed. The media of FIG. 4 provides reduced complexity of manufacture relative to the media of FIG. 3 while still providing polarization rotation enhancement. The media of FIG. 4 also uses two adjacent rare earth-transition metal films 20 and 22 with opposite sense magneto-optic hysteresis loops which are deposited directly on a low refractive index substrate 10' of low refractive index glass or other suitable low refractive index material. A dielectric layer 12 is also provided on film 20. Due to the low refractive index of substrate 10', the interface "2" will provide a significant reflection, reflected beam $R_2$, which will have the same direction of net Farraday rotation as the Kerr rotation of reflected beam $R_1$. Without the need for a separate relfective film, the media of FIG. 4 requires reduced manufacturing complexity. If the substrate 10' is metallic or a high refractive index material, a dielectric layer of low refractive index, such as silicon dioxide, would be deposited between the film 22 and the substrate 10'. In the bit area, the media of FIG. 4 provides, for the magnetization direction M shown and assuming that a counterclockwise rotation is positive, a $\theta_{net} \sim \theta_{K1}$ (due to beam portion $R_1$) $-2\theta_{F20}(R_2)$ (due to double passage of beam portion $R_2$ through layer 20) $+2\theta_{F22}(R_2)$ (due to double passage of beam portion $R_2$ through layer 22) whereas outside of the bit area $\theta_{net} \sim -\theta_{K1} + 2\theta_{F20}(R_2) - 2\theta_{F22}(R_2)$, thus once again providing significant real mode conversion and increased signal-to-noise ratio.

Components of the media of FIG. 4 corresponding to like components of the media of FIG. 3 would be of the same materials and physical dimensions, unless otherwise specified.

I claim:

1. A magneto-optic storage media including first and second layers of magnetic material, said layers having oppositely sensed magneto-optic hysteresis loops.

2. The magneto-optic storage media of claim 1 wherein one of said layers of magnetic material is significantly thicker than the other of said layers of magnetic material.

3. The magneto-optic storage media of claim 2 wherein said one of said layers is at least twice as thick as said other of said layers.

4. The magneto-optic storage media of claim 1 in which each of said layers is an alloy containing at least one rare earth-transition metal.

5. The magneto-optic storage media of claim 4 in which one of said layers has a transition metal concentration less than the compensation composition of the alloy and the other of said layers has a transition metal concentration greater than the compensation composition of the alloy.

6. The magneto-optic storage media of claim 1 in which said layers are adjacent each other.

* * * * *